United States Patent [19]

McFarlane

[11] 4,357,670

[45] Nov. 2, 1982

[54] DEVICES FOR TESTING SPRAYING NOZZLES

[75] Inventor: Phillip J. McFarlane, West Wittering, England

[73] Assignee: E. Allman & Company Limited, Chichester, England

[21] Appl. No.: 124,699

[22] Filed: Feb. 26, 1980

[30] Foreign Application Priority Data

Mar. 2, 1979 [GB] United Kingdom ............... 7907376
Sep. 17, 1979 [GB] United Kingdom ............... 7932114

[51] Int. Cl.³ ............................................... G01F 1/00
[52] U.S. Cl. .................................. 364/510; 73/195;
73/861; 235/92 FL; 239/146; 364/551
[58] Field of Search ................. 364/424, 510, 551;
73/195, 861, 861.02, 861.03, 861.61, 861.62;
239/155, 156, 162, 172, 164, 176, 146; 235/92 FL

[56] References Cited

U.S. PATENT DOCUMENTS

| | | | |
|---|---|---|---|
| 3,043,508 | 7/1962 | Wright | 235/92 FL |
| 3,693,838 | 9/1972 | Haker et al. | 239/155 |
| 3,729,996 | 5/1973 | Metz | 235/92 FL |
| 3,782,634 | 1/1974 | Herman | 239/156 |
| 4,023,020 | 5/1977 | LeStradet | 364/424 |
| 4,052,003 | 10/1977 | Steffen | 239/155 |
| 4,220,998 | 9/1980 | Kays | 364/510 |

*Primary Examiner*—Errol A. Krass
*Attorney, Agent, or Firm*—Salter & Michaelson

[57] ABSTRACT

A device for testing the performance of agricultural, horticultural or the like spraying equipment. The device includes a flowmeter, a fitting for coupling the flowmeter to a nozzle in the equipment, electrical circuit to which an electrical signal from the flowmeter is applied, and a visual display connected to the electrical circuit. In one embodiment, the electrical circuit scales the signal from the flowmeter and the display shows the rate of supply of liquid from the nozzle. In a second embodiment control means are provided for applying to the electrical circuit a signal representing a desired speed of forward travel and width of ground to be sprayed, and the display shows the volume of liquid then applied to unit area of the ground. In a third embodiment the electrical circuit includes a microcomputer and control means include a keyboard. By operating appropriate keys an operator can obtain a variety of displays, including the rate of supply of liquid from the nozzle, the speed to give a desired application rate and the application rate for a desired speed, and the average, maximum, minimum and percentage error of the rate of supply, speed and application rate.

24 Claims, 8 Drawing Figures

DEVICES FOR TESTING SPRAYING NOZZLES

This invention relates to devices for testing the performance of spraying nozzles in agricultural, horticultural or the like spraying equipment.

In spraying equipment which includes a spraybar or boom containing a series of mutually spaced spraying nozzles it is important that each nozzle supplies liquid at a predetermined rate and that it is matched to the remaining nozzles. The rate at which liquid is supplied from a nozzle is usually checked by directing the liquid into a measuring cylinder for a predetermined time, determined by a stop watch. The volume of liquid which the nozzle supplies to unit area of ground when the equipment is used is then calculated from a knowledge of the supply rate, the speed of travel and the pattern of liquid ejected from the nozzle. This method takes time and is subject to error.

A device for determining the volume of liquid supplied to unit area of ground from all of the nozzles on the boom of a spraying equipment has been disclosed in my British Pat. No. 1,507,149. Metering pumps have also been used, driven directly from a wheel of the spraying equipment. In order for the results indicated by these devices to be accurate across the whole length of the boom, the nozzles must give a uniform spray pattern, the overlap of the spray patterns from adjacent nozzles must be correctly arranged, and all nozzles must give the same output of liquid. Accordingly, it is still necessary to test the output from each nozzle, and because of nozzle wear such testing must be done frequently.

Owing to the cost and potential danger of under- or over-dosing with the liquids used in spraying, the accuracy required of the nozzle-testing device is high, preferably an error of less than 1%. Such accuracies are not readily obtained with mechanical flowmeters, for example tapered tube variable area type flowmeters, and the above-mentioned method employing a measuring cylinder and stop watch is usually employed. To achieve the desired accuracy, a measurement must extend over several seconds, and there may be many nozzles on the boom. If the flow rate is being adjusted, by varying the pressure applied to the liquid, several measurements may be needed before the desired output from a nozzle is achieved. In order to achieve a desired volume of application per unit area of ground it is then necessary to make a calculation involving speed of travel, the measured flow rate, and the nozzle spacing. More calculations are necessary to obtain maximum and minimum application rates across the length of the boom.

According to the present invention a device for testing the performance of agricultural, horticultural or the like spraying equipment comprises a flowmeter adapted to generate an electrical signal representing the rate at which liquid is supplied thereto, means for receiving liquid which has emerged from a spraying nozzle of the equipment and directing the liquid to the flowmeter, display means, electricl circuit means adapted, when the electrical signal from the flowmeter is applied thereto, to produce an output signal which represents a measure of the performance of the equipment which varies with the rate of supply of liquid from the nozzle, and means for applying the output signal to the display means, whereby the display means provide a display of the said measure of performance.

The electrical circuit means may be adapted to effect a scaling of the electrical signal from the flowmeter so that the output signal represents the said rate at which liquid is supplied from the nozzle.

Alternatively, the electrical circuit means may include manually operable control means, whereby the electrical circuit means are adapted to produce an output signal which is determined by the said rate of supply of liquid and at least one further property which, in conjunction with the said rate of supply, provides a measure of the performance of the equipment. In this case the control means may be adapted to provide a control signal representing a desired speed of forward travel of the equipment together with a desired width of ground sprayed by the nozzle in a direction perpendicular to the direction of travel, whereby the output signal provides a measure of the volume of liquid applied to unit area of the ground. The electrical circuit means may then be further adapted to produce an output signal which represents the average, maximum, minimum, or percentage error of the said measure of performance of the equipment.

The device is suitably portable and battery operated.

The means for receiving liquid may be made of a resilient material and be adapted for fitting to the nozzle so that all liquid which emerges from the nozzle is directed to the flowmeter. Suitably, at least part of the receiving means is funnel-shaped.

The invention will now be described, by way of example, with reference to the accompanying drawings, in which.

Figure 1:
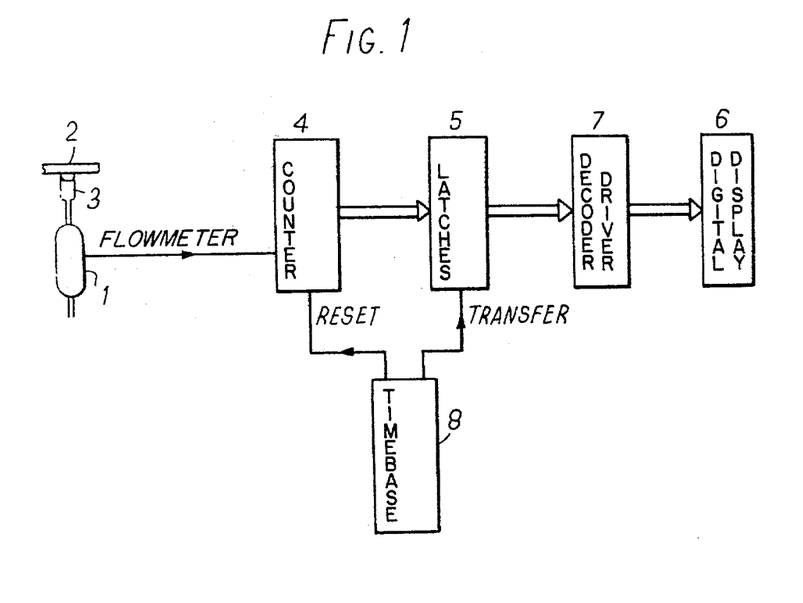
FIG. 1 is a schematic drawing of a first device according to the invention.
Figure 2:
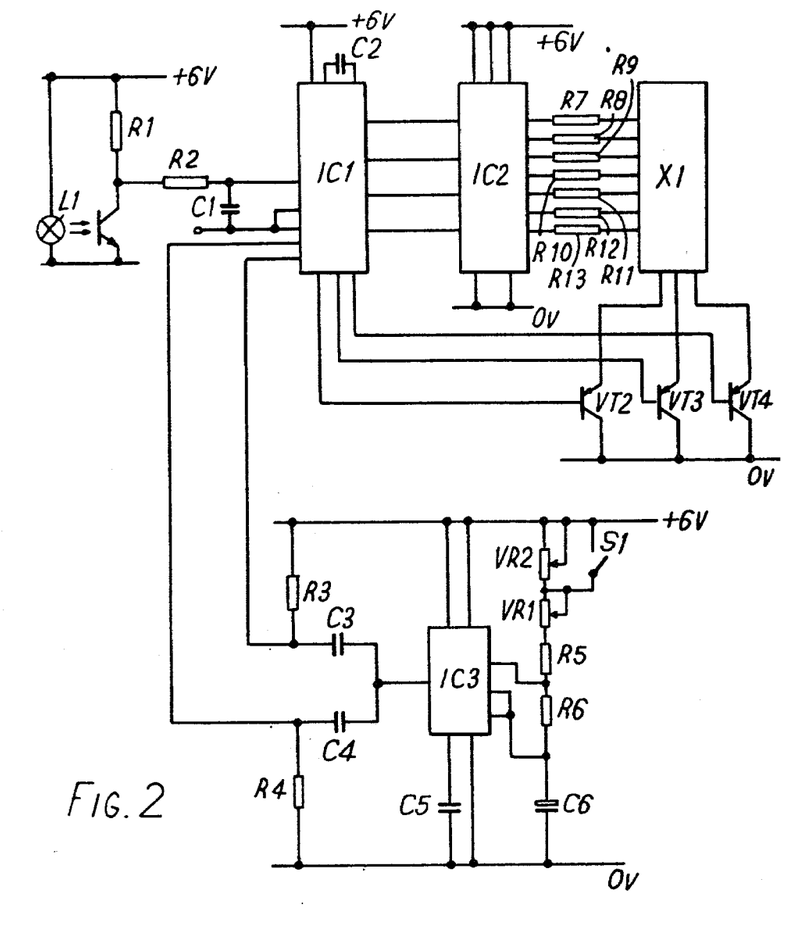
FIG. 2 shows details of electrical circuits in the device of FIG. 1.

The device shown in FIGS. 1 and 2 is used for testing the performance of equipment for spraying chemicals on to crops or de-icing aircraft runways. Such equipment includes a spraying boom which extends laterally of a self-propelled or tractor-drawn vehicle and has a series of nozzles mutually spaced along its length. A tank for storing spraying liquid is mounted on the vehicle and a pump is provided for drawing liquid from the tank and supplying the liquid to the nozzles on the boom. A pressure relief valve provides a return path to the tank from the outlet of the pump. The rate at which liquid is supplied to the ground is varied by changing the speed of travel of the equipment or by varying the pressure applied by the pump. It is possible to employ two tanks, one containing an active chemical and the other an inert liquid. The rate of supply of liquid is then varied by varying the ratio of active chemical to inert gas or liquid supplied to the nozzles, the spraying pressure being kept constant so as to ensure a good spray pattern. Spinning discs have been used in place of nozzles.

Figure 3:
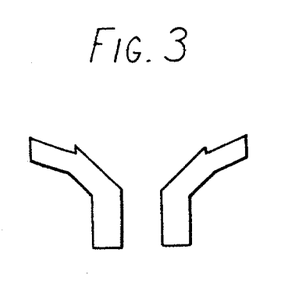
FIG. 3 is a section of a cap, included in the device of FIGS. 1 and 2, for fitting to a spraying nozzle.

In FIG. 1 a turbine flowmeter 1 at an input to the present device is shown coupled to a nozzle 2 on the spraying boom of the equipment by means of a fitting 3. The fitting 3, which is shown in section in FIG. 3, is made of soft rubber and has a funnel-shaped entry so that it can be secured to a variety of different nozzles. It is secured to the nozzle 2 in such manner that all of the spraying liquid emerging from the nozzle passes through the fitting to the flowmeter 1.

Connected to an output from the flowmeter 1 is a counter 4 whose outputs are in turn connected to latches 5. A decoder/driver circuit 7 couples the latches 5 to a digital display unit 6.

For controlling operating of the present device a timebase circuit 8 has a first, reset output connected to the counter 4 and a second, transfer output connected to the latches 5.

Referring now to FIG. 2 of the drawings, the flowmeter 1 of FIG. 1 is a helical turbine type flowmeter wherein light from a lamp L1 is interrupted by the turbine blades (not shown) in passing via an optical system (also not shown) to a photo-transistor VT1. The transistor VT1 has an emitter connected to earth potential and a collector connected via a pull up resistor R1 to a +6 volts supply line. There is therefore developed at the collector of the transistor VT1 a signal having a square-waveform and a frequency proportional to the rate of flow of liquid through the flowmeter.

A filter circuit made up of a resistor R2 and a capacitor C1 is connected to the collector of the transistor VT1 for filtering noise signals from the square-wave signal.

Connected to an output of the filter circuit is a first integrated circuit IC1 which is an MC14553 device (manufactured by Motorola Semi-conductors) and includes the counter 4 and the latches 5 of FIG. 1, together with a multiplexer. The counter 4 is a three decade, binary-coded decimal counter and there are three of the latches 5 associated with respective outputs of the counter.

A second integrated circuit IC2 is connected to the outputs from the circuit IC1. The circuit IC2 is an MC14511 device, which is a binary-coded decimal to seven segment decoder and corresponds to the circuit 7 of FIG. 1. Seven resistors R7 to R13 couple the outputs of the circuit IC2 to a common cathode light emitting diode display unit X1, which corresponds to the display unit 6 of FIG. 1. The display unit X1 includes three display devices, each associated with a respective one of three decades of the counter 4 and each connected to a respective one of three emitter follower transistors VT2, VT3 and VT4. Digit select outputs from the multiplexer in the circuit IC1 are connected to the bases of respective transistors VT2 to VT4 and supply driving signals for activating the transistors and coupling the three display devices to the resistors R3 to R9 in sequence.

As shown in FIG. 2, the timebase circuit 8 of FIG. 1 includes a third integrated circuit IC3, which is a 555 type timer connected as an oscillator. The period of the oscillator, and hence the time between set and reset pulses supplied to the counter 4 and latches 5, is determined by a network connected to the circuit IC3 and made up of variable resistors VR1 and VR2, resistors R5 and R6 and a capacitor C4. A switch S1 is connected in parallel with the variable resistor VR2. The variable resistors VR1 and VR2 and the switch S1 serve as calibration controls, as hereinafter described.

A capacitor C3 and resistor R3 form a differentiator circuit for supplying a transfer pulse from the circuit IC3 to the latches 5. A capacitor C4 and a resistor R4 form a second differentiator circuit for supplying a reset pulse to the counter 4.

In use, the turbine 1 of FIG. 1 is coupled to the nozzle 2 via the fitting 3 and an electrical signal of square waveform and frequency proportional to the rate of flow of liquid through the turbine is developed across the resistor R1 of FIG. 2, as described above. The signal is applied via the filter circuit to the counter 4 in the circuit IC1.

The count recorded by the counter 4 is set to zero each time a reset pulse is applied thereto from the capacitor C4 and the resistor R4 in the timebase circuit 8. The fresh count subsequently reached by the counter 4 is then transferred from the counter 4 to the latches 5 by the next transfer pulse from the capacitor C3 and resistor R3. Each reset pulse is produced by differentiating a positive-going change in voltage at the output of the circuit IC3 in the circuit 8 and each transfer pulse is produced by differentiating a negative-going change in the voltage. The time for which the output of the circuit IC3 remains at +6 volts, and hence the interval of time between the positive and negative-going changes in voltage and the time between each reset pulse and the succeeding transfer pulse, is determined by the voltages applied to the timebase circuit 8 from the network made up of variable resistors VR1 and VR2, resistors R5 and R6 and capacitor C6. These voltages are determined by the setting of the calibration controls VR1, VR2 and S1.

Thus, the device is calibrated prior to use by closing the switch S1, thereby applying a short circuit across the variable resistor VR2, supplying liquid at a known rate of liters/hour to the flowmeter 1, and adjusting the variable resistor VR1 until the display unit X1 indicates that known rate. The device is then calibrated in gallons/hour by opening the switch S1 and adjusting the variable resistor VR2 until the display unit X1 again indicates a flowrate in gallons/hour equal to known flowrate applied to the flowmeter 1.

In the result, the count recorded by the counter 4 in the time between a reset pulse and the next succeeding transfer pulse is dependent upon the rate of flow of liquid from the nozzle and the setting of the variable resistor VR1 or the settings of variable resistors VR1 and VR2.

As described above, the counter 4 produces a three decade, binary-coded decimal count which is transferred to the latches 5 by the next succeeding transfer pulse. The outputs of the latches are applied to a multiplexer, and from the multiplexer the four binary-coded signals representing the digit in each of the three decades of the count are applied sequentially to the converter 7 in the circuit IC2.

The converter 7 converts the first group of four binary-coded signals representing the digit in the first decade of the count into a series of seven voltages suitable for actuating a common cathode display device in the display unit 6. The seven voltages representing this first digit appear on respective resistors R7 to R13 at the same time as a driving signal for actuating the first display device is applied to the base of the transistor VT2 from the multiplexer in the circuit IC1. A visual representation of the first digit appears therefore on the first display device. Voltages representing the digits in the second and third decades of the count are likewise applied to the resistors R3 to R9 in synchronism with the application of driving voltages to the transistors VT3 and VT4, respectively, and visual representations of the second and thirds digits appear therefore on respective second and third display devices. This multiplexing is done sufficiently quickly for all digits to appear to be on simultaneously, and the display unit 6 provides therefore a visual display of the rate at which liquid is supplied from the nozzle, in liters/hour or gallons/hour according to whether the switch S1 is closed or open.

Figure 4:
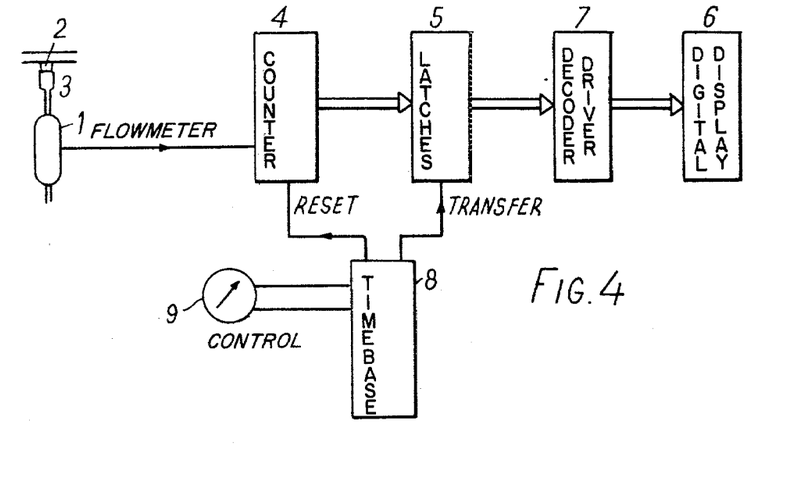
FIG. 4 is a schematic drawing of a second device according to the invention.
Figure 5:
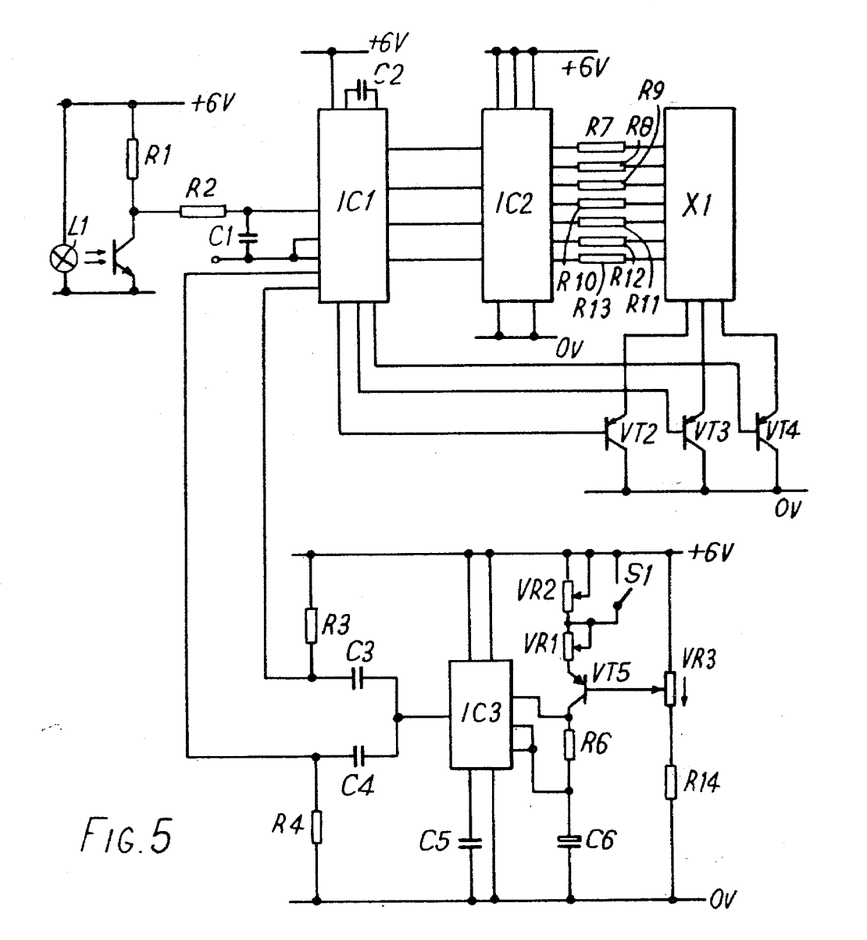
FIG. 5 shows details of electrical circuits in the device of FIG. 4.

FIGS. 4 and 5 show a second device according to the invention which is a modification of the device shown in FIGS. 1 to 3. The modified device provides a visual display of application rate, i.e. the volume of spraying liquid applied to unit area of the ground when the equipment is in use, or of the ground speed necessary to produce a predetermined application rate. To enable the device to provide such information, a manually operable control is provided and an additional signal, representing an assumed ground speed and an assumed spacing between nozzles on the spraying boom, is applied via this manual control.

Referring to FIG. 4, the flowmeter 1, the fitting 3, the counter 4, the latches 5, the decoder/driver circuit 7 and the display unit 6 of the present device are the same as in the device of FIGS. 1 to 3. The timebase circuit 8 of FIGS. 4 and 5 is likewise the same as that shown in FIGS. 1 to 3, apart from the addition of the manually operable control 9, shown in FIG. 4.

As shown in FIG. 5, the control 9 includes a transistor VT5 and associated biasing circuit which replace the resistor R5 of FIG. 2. The transistor VT5 has an emitter electrode connected to the variable resistor VR1, a collector electrode connected to the resistor R6, and a base electrode connected to a movable contact of a variable resistor VR3. The variable resistor VR3 is connected in series with a resistor R14 between the positive supply line and earth potential.

It will be appreciated that the transistor VT5 forms part of a current generator circuit, the magnitude of the current through the emitter-collector circuit of the transistor being determined by the bias applied to its base electrode, and hence upon the setting of the variable resistor VR3. The higher the setting of the variable resistor VR3 the more negative is the base of the transistor VT5 and the greater the current through the emitter-collector circuit of the transistor. The greater the current through the transistor VT5, the shorter the time for which the output of the circuit IC3 assumes a positive potential and the shorter the interval of time between the application of reset and transfer pulses to the counter 4. The count achieved by the counter 4 is therefore lower.

The variable resistor VR3 (control 9) has a pointer and a series of concentric dials, each calibrated in units of speed and each corresponding to a particular nozzle spacing (equivalent to the width of ground spraying by each nozzle). The angular spacing on a dial between the position of any particular speed and zero is inversely proportional to the particular nozzle spacing associated with that dial. Before use, the present device is calibrated by supplying liquid at a known rate to the flowmeter 1 and setting the variable resistor VR3 so that its pointer indicates a predetermined speed on the dial in use. The volume of liquid which would be supplied to unit area of the ground if the associated equipment were driven at the predetermined speed and had a series of nozzles mutually spaced by a predetermined distance and each supplied with liquid at the known rate is then computed. Finally, the variable resistor VR1 or VR2 is adjusted so that the display unit 6 indicates the computed volume per unit area. A fresh dial must be used for a change in nozzle spacing. A change from imperial to metric units of application rate can be achieved by operating the switch S1. Each dial can be marked in both imperial and metric units of speed.

In use, the appropriate dial is used for the variable resistor VR3 and the pointer is set to a predetermined ground speed at which spraying is to be effected. The fitting 3 is then attached to a nozzle so that liquid is supplied to the flowmeter 1. The display unit 6 then gives a visual indication of the volume of liquid supplied to unit area of the ground if the equipment is driven at the predetermined speed with the nozzle spacing appropriate to the dial in use.

An alternative mode of use is to adjust the variable resistor VR3 until the volume per unit area shown on the display unit 6 reaches a predetermined value. The pointer on the variable resistor VR3 then indicates the ground speed necessary to provide that volume per unit area, with a flowrate equal to the rate at which liquid is being supplied from the nozzle to the flowmeter 1.

By setting the control 9 to a certain position, the device can be used to read flow rate directly in suitable units. For example, with a nozzle spacing of 18 inches and a speed of 5.5 miles per hour, the display reads in gallons per hour.

In the devices of FIGS. 1 to 3 and FIGS. 4 and 5 the flowmeter 1 is of the positive displacement or turbine type in order to achieve the desired accuracy independently of density or viscosity of the spraying liquid. The pressure drop across the flowmeter is minimised to avoid changing the output of the nozzle 2 by connecting the device thereto.

It will be appreciated that the digital display device 6 can be replaced by an analogue meter.

Figure 6:
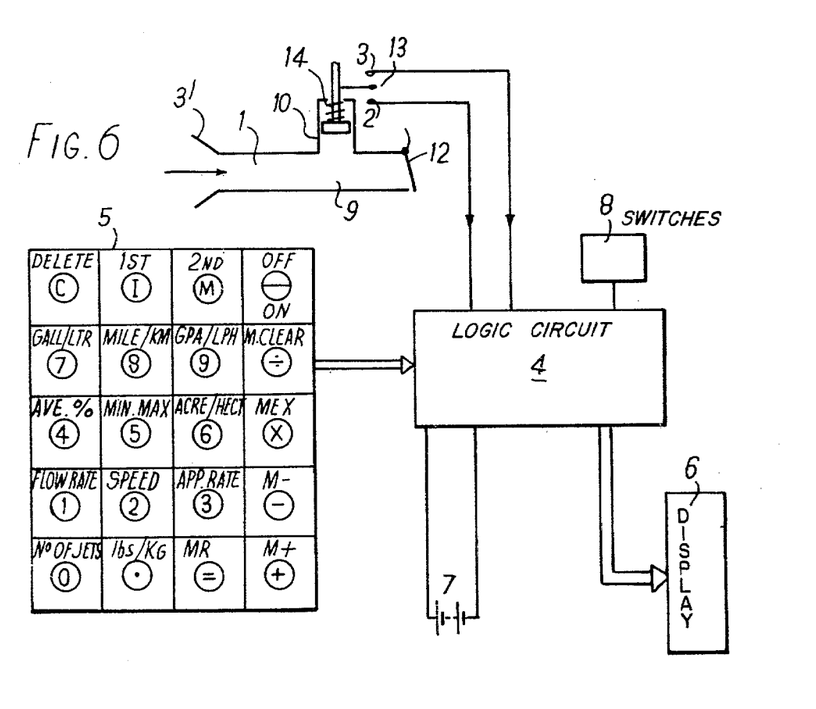
FIG. 6 is a schematic drawing of a third device according to the invention.

Referring now to FIG. 6 of the drawings, a third device according to the invention includes a flow transducer 1 of the positive displacement type. The transducer 1 includes a cylindrical measuring chamber 9 and a side chamber 10 containing a movable piston 11. A fitting 3' similar to the fitting 3 of FIG. 1 is connected to the chamber 9 so that the chamber can be coupled to a spraying nozzle (not shown). Normally, liquid from the nozzle passes straight through the chamber 9 to the ground. There is, however, a closure member 12 which an operator can use to close the outlet from the chamber 9. When this member 12 is closed, liquid from the nozzle is forced into the side chamber 10 and the piston 11 is moved in an axial direction along that chamber.

Coupled to the piston 11 is an arm carrying an electrical contact 13, which contacts an electrical line 2 at the beginning of the movement and then contacts an electrical line 3 when the piston has moved through a predetermined distance. The time between the contacts with lines 2 and 3, respectively, is inversely proportional to the flow rate. A spring 14 is provided for returning the piston 11 to its initial position after the operator has opened the member 12. This is then a positive displacement flowmeter.

The lines 2 and 3 are connected to a logic circuit 4, which includes an Intel 8048 integrated circuit together with a crystal, a regulated power supply and a display driving circuit. Associated with the circuit 4 is a keyboard 5 for entering into the circuit voltages representing known or desired measures of the performance of the equipment, for example, ground speed or volume of spraying liquid applied to unit area, and for obtaining various functions, for example, application rate, which can be derived from those measures. The circuit 4 is also provided with switches 8 for entering voltages representing different nozzle spacings on the associated spraying equipment.

The Intel 8048 is a microcomputer including input circuits for lines 2 and 3 and the switches 8, input/output circuits for coupling the keyboard 5 to the circuit 4, output circuits for driving a display 6, registers, an arithmetic logic unit and a program store. Operation of the microcomputer is controlled by a program in the program store, as hereinafter described.

As indicated in FIG. 6, the keyboard 5 includes keys 1 to 3 for applying to the circuit 4 voltages which cause the circuit to produce output signals representing flowrate, ground speed (assuming that application rate has been entered), and application rate or volume of liquid applied to unit area of the ground (assuming that ground speed has been entered).

When a number of nozzles have been tested, the keys 4 and 5 can be used as qualifiers to the keys 1 to 3 to obtain average, percentage, minimum and maximum values of any measure of performance such as flowrate obtained for those nozzles. There are also prefix keys I and M which determine whether readings are obtained in imperial or metric units, keys 6,7,8,9 and . for converting between metric and imperial units, an on/off key, a key 0 for checking on the total number of nozzles tested, and keys for performing normal calculator operations.

The output of the circuit 4 is connected to a multi-digit L.E.D. display 6. A battery 7 supplies current to the circuit 4.

In use, an operator couples the fitting 3' to a nozzle on a spraying boom, closes one of the switches 8 representing the spacing of nozzles which he intends to use, and then closes the member 12 on the cylinder 19. The piston 11 is forced along the side chamber 10 and the electrical contact 13 first contacts the line 2 and subsequently contacts the line 3. Each time the line 2 or the line 3 is contacted by the contact 13, a voltage signal is applied to circuit 4.

The program in the microcomputer in the circuit 4 causes the switches associated with the keys in the keyboard 5 to be scanned and the display 6 to be driven. With a few exceptions, to be described later, the circuit 4 reacts to the operation of any one of the keys in the manner of a pocket calculator.

Figure 7A:
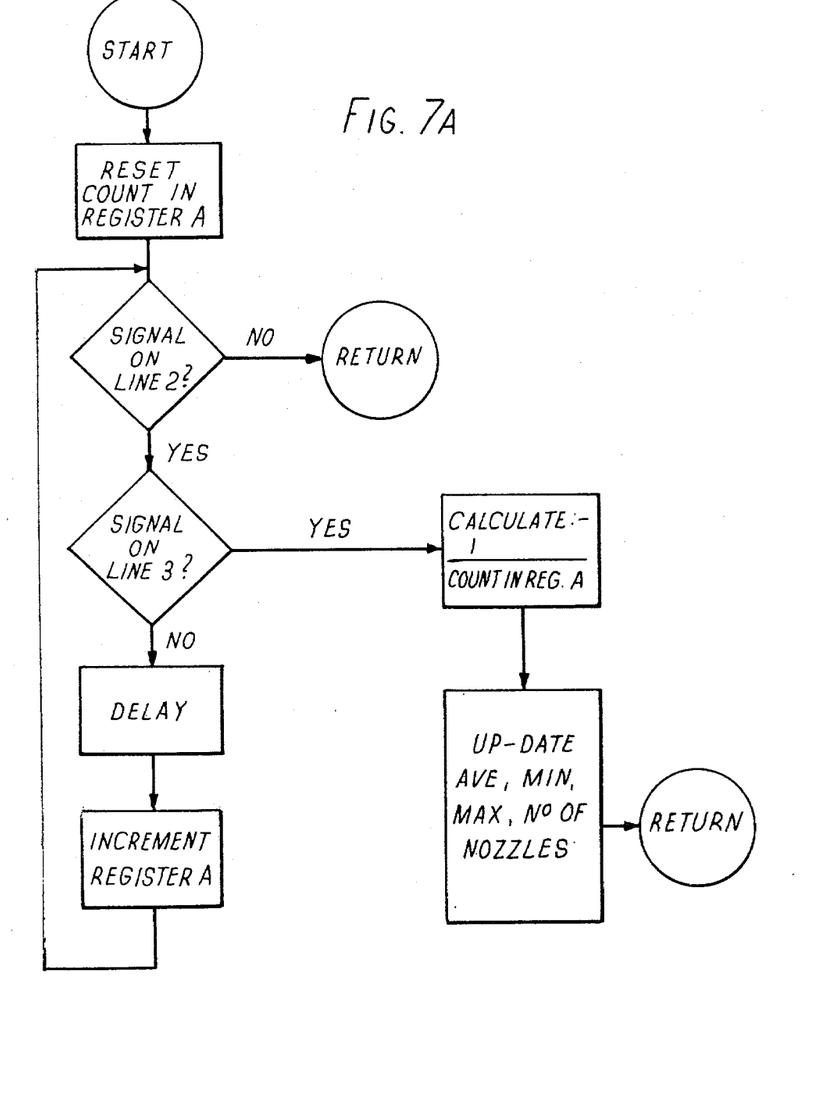
FIGS. 7A and 7B are flow charts associated with the operation of the third device.

If a signal appears on the line 2, due to contact with the contact 13, the signal is detected by the scanning and the program enters an interrupt routine shown by the flow chart of FIG. 7A. Referring to FIG. 7A, the program first cause a counter in a register A of the microcomputer to be set to zero and then re-checks that there is still a signal on the line 2. If the signal is no longer present, the program returns to its main scanning procedure. If there is still a signal on the line 2, the program checks whether there is yet a signal on the line 3. Assuming no signal on the line 3, there is a short delay before the count in the register A is incremented by one count and the program returns to re-check the signal on line 2. Once the contact 13 contacts the line 3, a signal appears on that line and is detected by the circuit 4. It will be appreciated that the time between the appearance of a signal on the line 2 and the appearance of a signal on the line 3 is proportional to the count recorded in the register A, and inversely proportional to the flowrate. Accordingly, once a signal is detected on the line 3, the program causes a calculation to be made of the reciprocal of the count in the register A. The result of the calculation is used to up-date stored values of the average, minimum and maximum of previous calculations and also to increment by one further count representing the total number of nozzles so far tested. The program then returns to scanning the keys in the keyboard 5.

If the operator wishes to display flowrate in imperial units, he depresses the key I followed by the key 1. The depression of these keys is detected by the program in scanning the keyboard 5, wherein the contents of the register A are multipled by a scaling factor and a number equal to the flowrate in imperial units is fed to the display unit 6. To display the flowrate in metric units, the key M followed by the key 1 is depressed.

If the operator wishes to know what speed of travel is required to give a predetermined application rate with the measured flowrate, he depresses the key I or M followed by the key 2. The program then follows the flow chart in FIG. 7B.

Figure 7B:
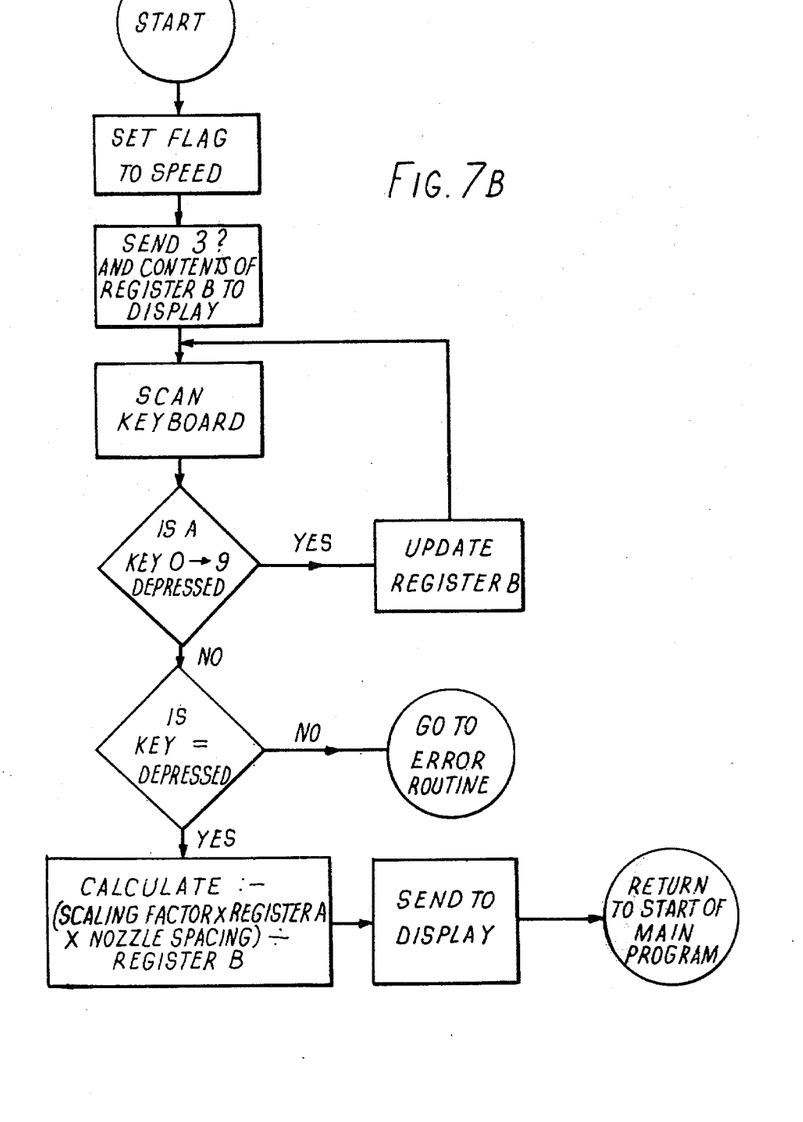

As shown in FIG. 7B, the program first sets a flag to speed. Next it causes a signal representing 3? which is a request for the desired application rate, and a further signal representing the contents of a register B, which is a number equal to the last application rate fed into the circuit 4, to be sent to the display 6.

The program then scans the keyboard 5. If the desired application rate is different from the one last fed into the circuit 4, the operator depresses one or more 'number' keys representing the desired rate (say, 2 and 0 for 20 gallons per acre). Depression of one or more 'number' keys is detected by the program, which updates the contents of the register B accordingly.

If any key other than one of the keys 0 to 9 or = or . is pressed, the program will move into an error routine. Depression of the key = is detected by the program, which causes a calculation to be made of the product of a scaling factor, the contents of register A and the nozzle spacing, all divided by the contents of register B. A signal representing the result of this calculation, which is equal to the desired speed, is then fed to the display 6. The program then returns to the start of the main program.

There is a similar procedure for obtaining an application rate for a given speed, the operator pressing key I or M followed by key 3. The display then shows 2 ? and the operator must depress the key = or one or more number keys followed by the key =½.

To obtain a display of the average for several nozzles of whatever measure of performance was last displayed, for example flowrate or application rate, the operator presses the key I followed by the key 4. The program then follows a similar routine to that described above with reference to FIG. 7B, except that the stored value of the average flowrate is substituted for the count in register A in the final calculation.

The key M followed by the key 4 is used to obtain the display last obtained as a percentage of some previous tests of the same measure of performance of some predetermined measure of performance. Thus, if the last display was an application rate, pressing keys M and 4 give a display of 3 ? together with the average of application rates so far measured. If the operator requires the latest application rate as a percentage of the average, the key = is pressed. If the percentage has to be expressed in terms of some other number, that number is inserted by using the appropriate number keys followed by the = key.

Pressing the keys I and then 5 gives the minimum value of the last series of displays, for example flowrate or application rate. Likewise the key M followed by the key 5 give the maximum of the last series of displays.

The keys 6,7,8,9 and . are used for effecting conversions between imperial and metric units in the manner of certain known calculators. For example, to convert 20 gallons per acre to metric units involves pressing the number keys 2 and 0 followed by key M, which stands for metric, and key 9, which is the key for converting gallons per acre to liters per hectare.

By pressing either of the prefix keys I or M followed by the key 0 one obtains a display of the total number of nozzles tested.

The key C is used to clear a display or an entry from the flowmeter made in error.

Finally, the keys $+,-,\times,\div$ and $=$ are used for performing conventional calculator functions and as memory control when preceded by key I or key M.

As an alternative to the microcomputer described above, a reprogrammed calculator integrated circuit can be used.

The visual display in each of the above devices can be replaced by an audio display, which may indicate an absolute value of a measure of performance or a deviation from a desired value.

We claim:

1. A device for individually testing the output performance of spraying nozzles of agricultural, horticultural or the like equipment while said nozzles are substantially stationary, comprising a flowmeter for generating an electrical signal representing the rate at which liquid is supplied thereto, means for receiving liquid which has emerged from one of said spraying nozzles and directing the liquid to the flowmeter, display means, electrical circuit means which, when the electrical signal from the flowmeter is applied thereto, produces an output signal which represents a measure of the performance of the nozzle which varies with the rate of supply of liquid from the nozzle, and means for applying the output signal to the display means, whereby the display means provides a display of the said measure of performance of the nozzle in the testing of said equipment for desired spraying performance.

2. A device as claimed in claim 1, wherein the electrical circuit means effect a scaling of the electrical signal from the flowmeter so that the output signal represents the said rate at which liquid is supplied from the nozzle.

3. A device as claimed in claim 2, wherein the flowmeter generates an alternating signal of frequency proportional to the said rate at which liquid is supplied thereto, and the electrical circuit means include a counter for counting the number of cycles of the alternating signal applied thereto, an oscillator for providing a first signal for resetting the counter and a second signal a predetermined interval of time after the first signal, and means for transferring a signal representing the count recorded by the counter in the said predetermined interval of time from the electrical circuit means to the display means.

4. A device as claimed in claim 1, wherein the electrical circuit means include manually operable control means, whereby the electrical circuit means produce an output signal which is determined by the said rate of supply of liquid and at least one further property which, in conjunction with the said rate of supply, provides a measure of the performance of the equipment.

5. A device as claimed in claim 4, wherein the control means provide a control signal representing a desired speed of forward travel of the equipment together with a desired width of ground sprayed by the nozzle in a direction perpendicular to the direction of travel, whereby the output signal provides a measure of the volume of liquid applied to unit area of the ground.

6. A device as claimed in claim 4, wherein the flowmeter generates an alternating signal of frequency proportional to the said rate at which liquid is supplied thereto, the electrical circuit means include a counter for counting the number of cycles of the alternating signal applied thereto, and an oscillator for providing a first signal for resetting the counter and a second signal a predetermined interval of time after the first signal, and the control means vary the period of the oscillator, thereby to vary the said predetermined interval of time in accordance with a change in the desired speed of forward travel or width of ground sprayed.

7. A device as claimed in claims 1, 2, 3 or 4, wherein the flowmeter generates first and second signals which are spaced by an interval of time whose duration is inversely proportional to the rate at which liquid is supplied thereto, and the electrical circuit means provide a signal representing the reciprocal of the said duration.

8. A device as claimed in claim 7, wherein the flowmeter includes a measuring chamber having an inlet for connection to the receiving means and an outlet, a side chamber which communicates with the measuring chamber at a location intermediate the inlet and the outlet, a piston slidable within the side chamber, means for closing the outlet so that liquid from the nozzle is forced into the side chamber and causes the piston to move along the side chamber and an electrical circuit associated with the piston for generating the first and second signals when the piston is at respective predetermined locations within the side chamber.

9. A device as claimed in claim 1, wherein a series of manually operable control means are interconnected with the electrical circuit means, a first one of the control means when operated causing the electrical circuit means to effect a scaling of the electrical signal from the flowmeter so that the output signal represents the said rate at which liquid is supplied from the nozzle.

10. A device as claimed in claim 9, wherein a second one of said control means provides a signal representing the speed of forward travel, further control means are provided for applying to the electrical circuit means signals representing respective predetermined volumes of liquid applied to unit area of the ground, and the electrical circuit means when the second control means and at least one of the further control means are operated, producing an output signal representing the speed of forward travel of the equipment necessary to provide the predetermined volume of liquid per unit area of ground corresponding to the operated further control means and to the rate of supply of liquid represented by the electrical signal from the flowmeter.

11. A device as claimed in claim 10, wherein a third one of the said control means provides a signal representing the volume of liquid applied to unit area of the ground, further control means are provided for applying to the electrical circuit means signals representing respective speeds of forward travel, and the electrical circuit means, when the third control means and at least one of the further control means are operated, produce an output signal representing the volume of liquid applied to unit area of the ground if the equipment is driven at the speed represented by the further control means operated and the rate of supply of liquid is that represented by the electrical signal from the flowmeter.

12. A device as claimed in claim 9, wherein a third one of the said control means provides a signal representing the volume of liquid applied to unit area of the ground, further control means are provided for applying to the electrical circuit means signals representing respective speeds of forward travel, and the electrical circuit means when the third control means and at least one of the further control means are operated producing an output signal representing the volume of liquid applied to unit area of the ground if the equipment is driven at the speed represented by the further control means operated and the rate of supply of liquid is that represented by the electrical signal from the flowmeter.

13. A device as claimed in claims 9, 10, 12 or 11, wherein a further control means is provided for applying to the electrical circuit means a signal which causes the electrical output signal to be varied in accordance with the width of ground sprayed by the nozzle.

14. A device as claimed in claim 13, comprising qualifier control means which, when operated in conjunction with one of the control means and at least one further control means, cause the electrical circuit means to produce an output signal representing respectively the average, maximum, minimum and percentage error of the value of the rate of supply of liquid, the speed of forward travel or the volume of liquid applied to unit area of the ground.

15. A device as claimed in claim 14, wherein the control means, the further control means and the qualifier control means are each operable by means of a corresponding key on a keyboard connected thereto.

16. A device as claimed in claim 14, wherein the electrical circuit means includes a programmed microcomputer.

17. A device as claimed in claim 13, wherein the control means, the further control means and the qualifier control means are each operable by means of a corresponding key on a keyboard connected thereto.

18. A device as claimed in claim 13, wherein the electrical circuit means includes a programmed microcomputer.

19. A device as claimed in claims 9, 10, 12 or 11, comprising qualifier control means which, when operated in conjunction with one of the control means and at least one further control means, cause the electrical circuit means to produce an output signal representing respectively the average, maximum, minimum and percentage error of the value of the rate of supply of liquid, the speed of forward travel or the volume of liquid applied to unit area of the ground.

20. A device as claimed in claim 19, wherein the control means, the further control means and the qualifier control means are each operable by means of a corresponding key on a keyboard connected thereto.

21. A device as claimed in claims 9, 10, 12 or 11, wherein the control means, the further control means and the qualifier control means are each operable by means of a corresponding key on a keyboard connected thereto.

22. A device as claimed in claims 9, 10, 12 or 11, wherein the electrical circuit means includes a programmed microcomputer.

23. A device as claimed in claim 1, the device being portable and battery operated.

24. A device as claimed in claim 1, wherein the means for receiving liquid are made of resilient material and fit to a nozzle so that all liquid which emerges from the nozzle is directed to the flowmeter.

* * * * *